United States Patent Office 3,259,506
Patented July 5, 1966

---

3,259,506
SWEETENING COMPOSITION
Benjamin Eisenstadt, Brooklyn, N.Y., assignor to Cumberland Packing Company, Brooklyn, N.Y.
No Drawing. Filed Feb. 9, 1965, Ser. No. 431,455
1 Claim. (Cl. 99—141)

This application is a continuation-in-part of my copending patent application Serial No. 389,192, filed August 12, 1964, now abandoned, for "Sweetening Compositions," which in turn is a continuation-in-part of my patent application Serial No. 233,953, filed October 29, 1962, for "Sweetening Compositions," now abandoned.

This invention relates to new sweetening compositions, and more particularly to sweetening compositions which have substantially no caloric content, but which do not have any of the undesired bitter aftertaste of known sweetening compositions.

It is well known that persons who are advised to reduce their caloric intake, whether for medical reasons or simply for reasons of diet, are generally told to avoid sugar because of its high caloric value and to substitute artificial sweeteners such as the saccharines and the cyclamates (which latter are sold under the trademark "Sucaryl").

Although both of these groups of substances have a very high degree of sweetness and have substantially no caloric value, both of these groups of substances suffer from the disadvantage of leaving a bitter aftertaste in the mouth of the user. In many cases this bitter aftertaste actually makes the person somewhat nauseous.

The cylclamates have about 30 times the sweetening power of pure sugar (in referring to sugar, what is meant always is the normal cane sugar or beet sugar which is used commercially for sweetening and which actually mainly consists of sucrose. However, as indicated above, this high sweetening power is not a pure sweetening because the use of cyclamates results in a bitter aftertaste.

The saccharines have a much higher degree of sweetening power, namely about 300 times the sweetening power of sugar. However, the saccharines too suffer from the disadvantage of leaving a bitter aftertaste. Attempts have been made to overcome this bitter aftertaste by mixing the two groups of sweeteners, in order to use a lesser amount of each of the sweeteners. However, this still results in a bitter aftertaste in the mouth of the user.

It is therefore a primary object of the present invention to provide an artificial sugar-free sweetening composition which does not have any bitter aftertaste.

It is another object of the present invention to provide a new sugar-free sweetener which not only does not have any bitter aftertaste, but which also does not in any way adversely affect the taste of the food or beverage with which the same is used.

It is still a further object of the present invention to provide new sugar-free artificial sweeteners which, although providing some calories, are of such low caloric intake as to be considered as practically having no fattening effect, and which nevertheless gives the closest approximation to natural sweetening of sugar while leaving no bitter aftertaste.

It is yet a further object of the present invention to provide sugar-free sweetening compositions which can be used with all types of foods, such as candy, baked goods, beverages, meat products, fruits, and the like to give a true sweetening effect with substantially no calories and with no bitter aftertaste or other undesirable taste effects of known sweeteners.

Other objects and advantages of the present invention will be apparent from a further reading of the specification and of the appended claims.

With the above and other objects in view, the present invention mainly comprises a new sweetening composition comprising an artificial sweetener consisting of a mixture of a saccharine and a cyclamate, the amount of the artificial sweetener being such as to be equivalent in sweetening effect to a predetermined amount of sugar (sucrose or dextrose) plus lactose in an amount of 5–25 times the amount of the artificial sweetener but not more than about 20% of the predetermined amount of sugar.

Thus, when using saccharine alone as the artificial sweetener, the components of the compositions of the present invention are present in a ratio of about 75 to 125 lbs. of lactose per each about 2.5–15 lbs. of saccharine artificial sweetener, and preferably 3–10 lbs. of saccharine artificial sweetener.

When using a mixture of a saccharine and a cyclamate as the artificial sweetener, the components of the compositions of the present invention are present in a ratio of 75–125 lbs. of lactose per inch 3–20 lbs. of cyclamate artificial sweetener (preferably 5–10 lbs. of cyclamate artificial sweetener) per each 2–8 lbs. of saccharine artificial sweetener (preferably 3–7 lbs. of saccharine artificial sweetener).

The most preferred composition consists essentially of about 100 lbs. of lactose per each 5 lbs. of cyclamate artificial sweetener per each 2 and ½ lbs. of saccharine artificial sweetener.

It has been found that when lactose is used with saccharine alone, or most preferably with a mixture of saccharine and a cyclamate, in the proportions herein set forth, the resulting composition is of extremely low caloric content and it very closely approximates the taste of natural sugar without leaving any bitter aftertaste. In addition, this sweetening composition does not have any adverse taste effect on the food or beverage with which the same is used.

Thus, a composition of the type set forth herein can be used for the sweetening of beverages such as tea, coffee, cocoa, or the like, and can be used to achieve the desired sweetness to a degree which closely approximates that of pure sugar, while not having any deleterious effect whatsoever on the taste of the beverage.

Similarly, the compositions of the present invention can be used for the making of candy, in place of sugar, to provide low calorie candies which are sweet as though the same had been sweetened with cane sugar or the like, without adversely affecting the taste of the candy. The same holds true for the use of compositions of the present invention for meat products which might have to be sweetened, and for fruits, for example for canned fruits and the like, to make the products of relatively low caloric value, while being sweetened without adversely affecting the taste of the food product.

The compositions of the present invention can also be used for the making of baked goods in the place of sugar, for example bread, muffins, and the like, provided that the amount of sugar required in the particular recipe is not so great that the bulking effect of the sugar is necessary for the making of the desired baked goods.

The term "saccharine artificial sweetener" as used throughout the specification and claims of this case is meant to refer to saccharine itself and the salts thereof such as sodium saccharine, potassium saccharine, etc. The term "cyclamate artificial sweetener" as used throughout the specification and claims of this case is meant to refer to cyclohexylsulfamic acid and its salts thereof such as the sodium, potassium and calcium salts (which are sold under the trademark "Sucaryl."

It has been found that lactose has the effect, when used in sufficient quantity, and when used with a saccharine artificial sweetener or a cyclamate artificial sweetener to depress or completely destroy the bitter aftertaste of the saccharine artificial sweetener and/or of the cyclamate artificial sweetener. However, it has further been found that if too great an amount of the lactose is used together with the artificial sweetener, then the lactose not only depresses or removes the bitter aftertaste of the artificial sweetener, but in addition, the lactose has the undesired effect of changing the taste of the food or beverage to which it is applied. Thus, for example, while up to about 1 gram of lactose will not have any pronounced adverse effect on the taste of a cup of coffee, any amount substantially greater than 1 gram of lactose per cup of coffee will change the taste of the coffee.

Accordingly, while sweetening compositions according to the present invention, that is a sweetening composition comprising an artificial sweetener and lactose will not cause any undesired bitter after taste, in the event that the proportions of the sweetening composition are not adjusted in such manner as to avoid the presence of more than about 1 gram of the lactose per each cup of the beverage to which the sweetening composition is to be applied (and a like amount of a solid food), while the sweetened food may not have the bitter aftertaste of the artificial sweetener, it may nevertheless have an undesirable taste because of the effect of the lactose in removing the taste of the food or beverage to which the sweetening composition is applied.

It is for this reason that, in accordance with the present invention it is possible to have a composition of saccharine alone plus lactose or a composition of saccharine plus cyclamate plus lactose but it is not possible to have a composition of cyclamate alone plus lactose. The reason for this is that the cyclamate alone has only about 30 times the sweetening power of sugar, and it is necessary to have the lactose present in an amount of about 5 to 10 times the amount of the artificial sweetener in order to avoid the bitter aftertaste of the artificial sweetener. Accordingly, if, for example, the sweetening effect of 1 teaspoon of sugar were desired and the cyclamate were used alone, then about one-third of a gram of cyclamate would be used. In order to avoid the bitter aftertaste of this amount of cyclamate about 10 times the amount thereof or about 3 grams of lactose would be necessary. If a composition of these proportions were used to sweeten a cup of coffee, the resulting beverage would be sweet, it would not have any bitter aftertaste, but it would not taste like coffee.

Accordingly, in order to achieve the desired removal of bitter aftertaste without having too great a quantity of lactose present, it is necessary to make use of the far greater sweetening power of saccharine. A composition of saccharine plus an amount of lactose sufficient to remove the bitter aftertaste of the saccharine could be used without its being necessary to have so much lactose present as to come up against the disadvantage of adversely affecting the taste of the food or beverage to which the sweetening composition is applied. Most preferably in accordance with the present invention the composition which is used consists essentially of the saccharine, the cyclamate and the lactose. By using a mixture of both a saccharine artificial sweetener and a cyclamate artificial sweetener the advantage of the extreme sweetness of the saccharine is present so that not too much cyclamate is needed and not too much lactose is needed, and the additional advantage is obtained that a lesser amount of saccharine is used than would otherwise be necessary for the same sweetening effect and consequently there is practically a complete removal of any bitter aftertaste whatsoever.

It should be noted that although lactose is chemically a sugar, it is not generally used for sweetening. It apparently has a leaching effect on other tastes than sweetness so that it leaches out or masks the bitter aftertaste of the artificial sweeteners when used in sufficient quantities and if used in too great a quantity it will also leach out or mask the taste of the food or beverage to which it is applied.

The following examples are given to further illustrate the present invention. The scope of the invention is not, however, meant to be limited to the specific details of the examples.

*Example 1*

100 pounds of lactose (powdered), 15 pounds of calcium cyclamate and 5 pounds of calcium saccharine are thoroughly mixed to provide a uniform mixture.

The resulting mixture is many times as sweet as natural sugar so that a small amount thereof can be used in place of the sugar to give a sweetening effect with low caloric intake. In addition, this composition will have no adverse effect on the food or beverage to which it is applied. This composition can be used to sweeten beverages, or cooking, etc. No matter in what quantities the same is used, even to highly sweeten beverages, the resulting sweetening effect is achieved with no bitter aftertaste.

*Example 2*

A sweetening composition is prepared as in Example 1 using 75 pounds of lactose, 20 pounds of calcium cyclamate and 7 pounds of calcium saccharine.

*Example 3*

A sweetening composition is prepared as in Example 1, using 125 pounds of lactose, 10 pounds of calcium cyclamate and 6 pounds of sodium saccharine.

*Example 4*

A sweetening composition is prepared by thoroughly mixing 100 pounds of lactose (powdered) with 8 pounds of sodium saccharine to provide a uniform mixture.

*Example 5*

A sweetening composition is prepared as in Example 1 using 100 pounds of lactose, 10 pounds of calcium cyclamate and 5 pounds of calcium saccharine.

*Example 6*

A sweetening composition is prepared as in Example 1, using 100 pounds of lactose, 5 pounds of calcium cyclamate and 2.5 pounds of sodium saccharine.

*Example 7*

A sweetening composition is prepared by thoroughly mixing 100 pounds of powdered lactose with 3 pounds of sodium saccharine to provide a uniform mixture.

*Example 8*

A cup of coffee is sweetened with 1 gram of the composition of Example 6. The resulting coffee tastes as though it had been sweetened with 2 teaspoons (10 grams) of ordinary sugar.

*Example 9*

A white bread is baked in usual manner using 6 cups of flour, 1 tablespoon of shortening, 2 teaspoons of salt, 2 cups of milk and ¼ cup of water, and for sweetening purposes there is used 3 grams of the composition of Example 6. The white bread is found to have an excellent flavor with no bitter characteristics.

*Example 10*

An applesauce is prepared by cooking 5 pounds of quartered and peeled Macintosh apples with 6 cups of water and 30 grams of the composition of Example 5. The resulting applesauce has a sweet, natural taste.

*Example 11*

Tongue Polanaise is prepared by boiling a steer tongue, cutting the same into cubes, and adding the cubes to a sauce prepared from the following: 1 and ½ ounces raisins, ¾ cup of a sweet wine, 2 onions, 1 can of tomato sauce, ⅛ cup of lemon juice and 7 and ½ grams of the composition of Example 4. The resulting Tongue Polanaise has an excellent flavor, no bitterness and tastes as though the same had been cooked with pure sugar.

Example 12

A chocolate fudge is prepared using ¾ cup of milk, 2 ounces of unsweetened chocolate, a dash of salt, a teaspoon of corn syrup, 2 tablespoons of butter, and 1 teaspoon of vanilla. This recipe calls for 2 cups of sugar. Instead of two cups of sugar there is used 1 cup of sugar and 30 grams of the composition of Example 6. The cup of sugar is necessary for the bulking, and by using 30 grams of the composition of Example 6 in place of the other cup of sugar the caloric content is considerably reduced. Nevertheless, the resulting fudge tastes as pure and sweet as though it had been made only with sugar and no artificial sweetening.

The basis of the present invention is fully revealed from the above discussion, and modifications and adaptations therefore are and should be considered as falling within the meaning and range of equivalence of the following claim.

I claim:

A sweetening composition consisting essentially of powdered lactose, a cyclamate artificial sweetener and a saccharine artificial sweetener in a ratio of about 75 to 125 pounds of said lactose per each 3–10 pounds of said cyclamate artificial sweetener and each 2–8 pounds of said saccharine artificial sweetener.

References Cited by the Examiner

UNITED STATES PATENTS

| | | | |
|---|---|---|---|
| 3,011,897 | 12/1961 | Grosvenor | 99—141 |
| 3,014,803 | 12/1961 | Peebles | 99—141 |
| 3,170,801 | 2/1965 | McNaught | 99—141 |

FOREIGN PATENTS

| | | |
|---|---|---|
| 589,019 | 12/1959 | Canada. |
| 425,939 | 10/1947 | Italy. |

OTHER REFERENCES

Hunziker, "Condensed Milk and Milk Powder," seventh ed., 1949, pub. by the author, La Grange, Illinois, p. 454.

Kaufman, "The Sugar-Free Cookbook," copyright Mar. 9, 1964, C444, a Dolphin Handbook Original, Doubleday & Co., Inc., Garden City, N.Y., pp. 55, 67, 68, 104.

Moncrieff, "The Chemical Senses," 1944, Leonard Hill Limited, London, England, p. 104.

Rose et al., "The Condensed Chemical Dictionary," 5th ed., 1956, Reinhold Pub. Corp., New York.

A. LOUIS MONACELL, *Primary Examiner.*

J. M. GOLIAN, *Assistant Examiner.*